(12) United States Patent
McHugh

(10) Patent No.: US 8,402,979 B2
(45) Date of Patent: Mar. 26, 2013

(54) HAIR WASH AND RINSE BRUSH

(76) Inventor: David McHugh, West Allis, WI (US)

(*) Notice: Subject to any disclaimer, the term of this patent is extended or adjusted under 35 U.S.C. 154(b) by 17 days.

(21) Appl. No.: 12/787,622

(22) Filed: May 26, 2010

(65) Prior Publication Data

US 2011/0067717 A1   Mar. 24, 2011

Related U.S. Application Data

(60) Provisional application No. 61/243,723, filed on Sep. 18, 2009.

(51) Int. Cl.
*A45D 24/22* (2006.01)

(52) U.S. Cl. .......................................... 132/114

(58) Field of Classification Search .......... 132/112–116, 132/152, 154; 15/205.2; 119/602–606, 626, 119/664, 665, 668; 601/154, 134, 135, 141; 401/286, 287; D28/21, 25, 28; 4/606
See application file for complete search history.

(56) References Cited

U.S. PATENT DOCUMENTS

| | | | |
|---|---|---|---|
| 671,047 A * | 4/1901 | Fox | 401/28 |
| 1,704,959 A * | 3/1929 | Butler | 132/115 |
| 2,027,884 A | 1/1936 | Schwab | |
| 2,250,878 A * | 7/1941 | Quaranti | 401/28 |
| 2,946,074 A * | 7/1960 | Caldwell | 401/19 |
| 3,053,264 A * | 9/1962 | Breton | 132/116 |
| 3,405,997 A | 10/1968 | Diebold | |
| 3,872,533 A | 3/1975 | Proffit | |
| 4,103,381 A | 8/1978 | Schulz et al. | |
| 4,121,602 A | 10/1978 | Young | |
| 4,177,532 A | 12/1979 | Azuma | |
| 4,672,953 A | 6/1987 | DiVito | |
| 4,902,154 A * | 2/1990 | Valenza | 401/132 |
| 4,977,909 A | 12/1990 | Chou | |
| 5,109,553 A * | 5/1992 | Kishimoto | 4/518 |
| 5,297,882 A | 3/1994 | Kornides | |
| 5,309,590 A | 5/1994 | Giuliana | |
| 5,649,502 A * | 7/1997 | Frank | 119/665 |
| 5,664,587 A | 9/1997 | Gebhart | |
| 5,975,089 A * | 11/1999 | Simon | 132/113 |
| 6,035,806 A | 3/2000 | Lorenzo | |
| 6,085,379 A | 7/2000 | Stafford | |
| 6,457,476 B1 | 10/2002 | Elmer et al. | |
| 6,793,434 B1 * | 9/2004 | Olson | 401/286 |
| 6,948,451 B2 * | 9/2005 | Bond et al. | 119/665 |
| 7,337,784 B2 * | 3/2008 | Hurwitz | 132/116 |
| 2004/0187883 A1 * | 9/2004 | Shah et al. | 132/112 |
| 2004/0261808 A1 * | 12/2004 | Kluge | 132/115 |
| 2007/0261643 A1 * | 11/2007 | Hurwitz | 119/602 |
| 2008/0099031 A1 * | 5/2008 | Walters et al. | 132/120 |
| 2010/0186762 A1 * | 7/2010 | Spagnuolo | 132/115 |

* cited by examiner

*Primary Examiner* — Nicholas Lucchesi
*Assistant Examiner* — Niyati D Shah
(74) *Attorney, Agent, or Firm* — Joesph S. Heino; Patrick M. Bergin

(57) ABSTRACT

A hair wash and rinse brush provides for a substantially flat brush structure that comprises a handle portion and a paddle, or "brush," portion. The brush portion incorporates a plurality of apertures. Some of the apertures have hollow bristles disposed within them. In this fashion, water can be dispersed directly onto the hair of the user or the user's pet and directly onto the user's scalp or onto the pet's skin during washing and rinsing. The brush may also alternatively include an enclosure at the back of the brush, the enclosure for attaching the brush to a water supply. The enclosure can also be configured to be removably attachable to the back of the brush.

1 Claim, 3 Drawing Sheets

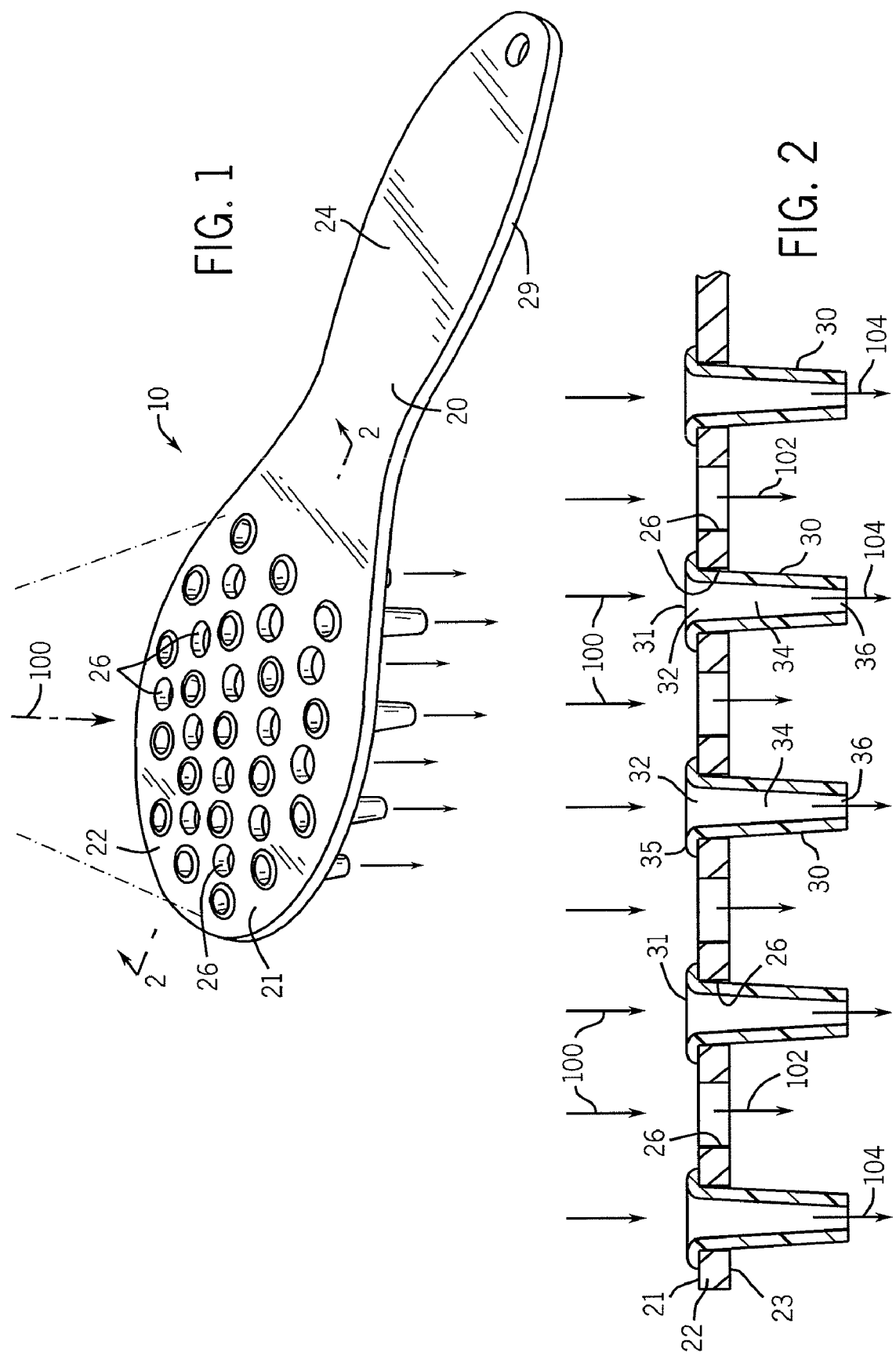

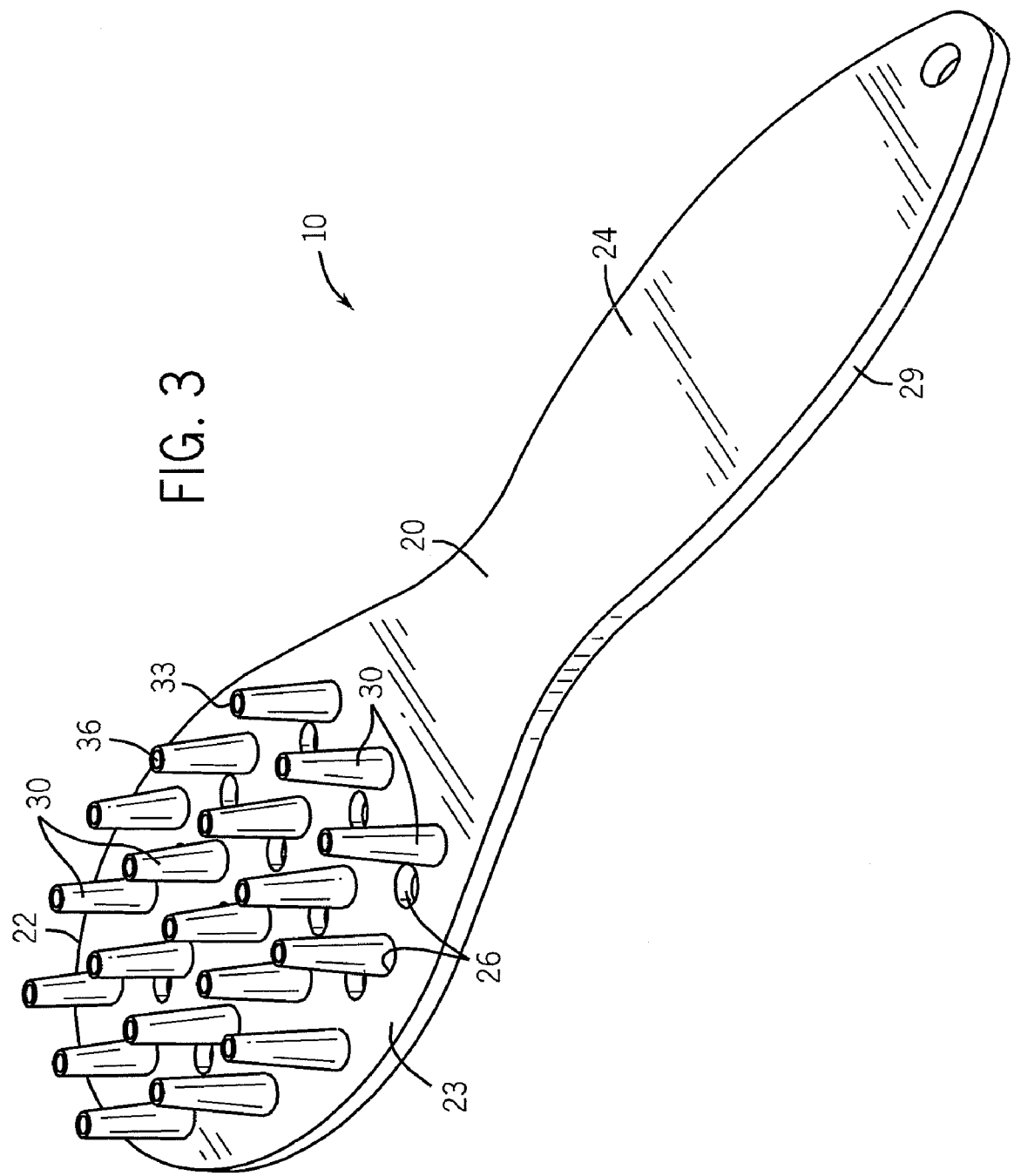

HAIR WASH AND RINSE BRUSH

This application claims the benefit and priority of U.S. Provisional Patent Application No. 61/243,723 filed Sep. 18, 2009.

FIELD OF THE INVENTION

This invention relates generally to hair brushing devices and the like. It also relates generally to devices that are used to spray water and to distribute water over a surface. More particularly, it relates to a combined hair wash and rinse brush that allows water to be distributed onto a surface by means of hollow bristles and by means of apertures defined within the brush handle. It also relates to such a combined hair wash and rinse brush that can be directly attached to a water supply line or that can be used by itself and without a water supply line attached directly to it.

BACKGROUND OF THE INVENTION

Hair brushing devices are well known in the art. Originally made of wood with stiff bristles extending from it, hair brushing devices have been around for a long time. Indeed, one of the first United States patents for a hair brushing device was disclosed in U.S. Pat. No. Des. 645 to Rock. Such a hair brushing device, or "hair brush," comprises a handle of some sort, a paddle (also called a "club" or a "block"), and a plurality of rigid bristles (or "teeth") extending from the paddle. Such hair brushes are commonly used today for brushing and detangling human hair, as well as for grooming the hair of domestic animals.

In the art of water spraying devices, a water nozzle is coupled to a water supply line and water will exit the nozzle and spray onto a surface. For example, a shower head can be used to direct water onto the head of a person while in the shower. When sprayed onto the head, the water will wet the hair and then run off the hair. In order to penetrate the hair, particularly if the person's hair is thick and full of soap or shampoo, the person will need to use his or her fingers to work the water to the scalp and underneath the hair to effect effective rinsing of the hair. The same experience exists when a pet owner washes his or her pet.

For example, in the situation where a dog is being washed, the dog's fur will first be wetted by the spray nozzle. The owner will then apply soap or shampoo to the animal. To rinse the animal, and to remove all of the soap or shampoo from the animal, such soap or shampoo being otherwise a potential irritant to the animal, the owner must hold the spray nozzle in one hand and use the other hand to "work" the water deep into the coat of the pet. This can be a time-consuming and laborious task, even assuming that the animal is well-behaved and likes baths.

In the view of this inventor, there is a need for a need for a new, useful and non-obvious improved hair brushing device that utilizes a modified hair brush that enables the brush with water-rinsing capabilities and also provides multiple areas for hair and skin rinsing. This hair wash and rinse brush combination would create a water rinsing layer that would be on top of the hair to be rinsed and would also create a water rinsing region at or near the skin. Such a device would allow the user to more quickly and more thoroughly rinse soap or shampoo from the hair and skin of the user or the user's pet as may be desired or required. In this fashion, the rinse process would be more efficient and take less time to complete. It would also result in a reduction of the amount of water needed to complete the rinsing process.

SUMMARY OF THE INVENTION

It is, therefore, a principal object of this invention to provide a new, useful, and non-obvious hair washing and rinsing brush device that creates multiple water rinsing layers for washing and rinsing the hair of a user or a user's pet. It is still another object of this invention to provide such a device that is simple in construction and in use. It is still another object of this invention to provide such a device that requires a minimal number of parts and is alternatively configured to be attachable to a water supply hose of conventional manufacture.

The present invention has obtained these objects. In a first preferred embodiment, it provides for a substantially flat brush structure that comprises a handle portion and a paddle, or "brush," portion. The brush portion incorporates a plurality of apertures. Some of the apertures have hollow bristles disposed within them. In this fashion, water can be dispersed directly onto the hair of the user or the user's pet and directly onto the user's scalp or onto the pet's skin during washing and rinsing. A second preferred embodiment provides an enclosure at the back of the brush, the enclosure having means for attaching the brush to a water supply. The enclosure can also be configured to be removably attachable to the back of the brush.

The foregoing and other features of the hair wash and rinse brush that is constructed in accordance with this invention will be apparent from the detailed description that follows.

BRIEF DESCRIPTION OF THE DRAWINGS

FIG. 1 is a top, rear and right side perspective view of a first preferred embodiment of a hair wash and rinse brush that is constructed in accordance with the present invention.

FIG. 2 is an enlarged right side elevational and cross-sectioned view of the brush portion of the hair wash and rinse brush illustrated in FIG. 1 and taken along line 2-2 of FIG. 1;

FIG. 3 is a bottom, rear and right side elevational view of the hair wash and rinse brush shown in FIG. 1.

DETAILED DESCRIPTION

Figure 2A:
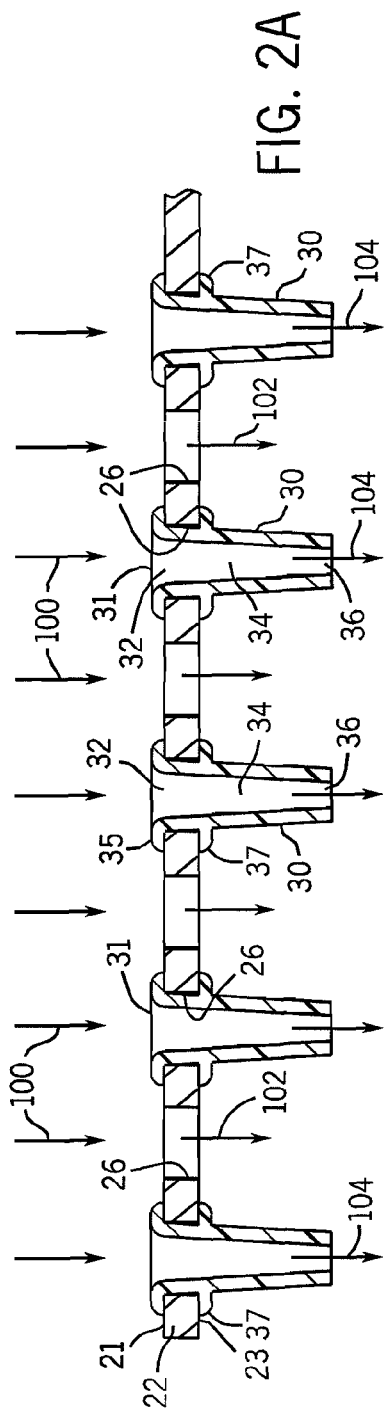
FIG. 2A is the same as FIG. 2 but shows an alternative embodiment of the bristles of the hair wash and rinse brush.

Referring now to the drawings in detail, wherein like numbered elements refer to like elements throughout, FIG. 1 illustrates a first preferred embodiment of a hair wash and rinse brush, generally identified 10, which is constructed in accordance with the present invention.

As shown, the hair wash and rinse brush 10 includes a substantially flat and planar back 20, the back 20 having a forwardly-disposed "paddle" or brush portion 22 and a rearwardly-disposed handle portion 24. The use of the flat and planar back 20 by this inventor is intended to achieve simplicity in the design and to reduce the cost of manufacture. The hair and rinse brush 10 could be fabricated of a thicker back, or of a back that is more contoured, than is shown and such is not a limitation of the present invention.

The handle portion 24 is intended to be grasped by a user. The brush portion 22 is configured with a plurality of apertures 26. Each aperture 26 is substantially circular and extends through the brush portion 22 from the back surface 21 of the brush portion 24 to the front surface 23 of the brush portion 22. See FIG. 2. When used as intended, the hair wash and rinse brush 10 is held by the user such that water 100 coming from a source, such as a shower head (not shown), strikes the back surface 21 of the brush portion 24 and passes through the plurality of apertures 26.

In the preferred embodiment, the brush portion 22 of the hair wash and rinse brush 10 incorporates a plurality of tapered tubular bristles 30, each bristle 30 being hollow with a centrally-disposed and longitudinally-extending bristle tubes 34 defined within it. Each bristle 30 includes a first end 31 having a bristle tube inlet 32. Each bristle 30 also has a second end 33 having a bristle tube outlet 36. As is seen in FIG. 2, the centrally-disposed bristle tube 34 of each bristle 30 is tapered, with the inlet 32 having a wider diameter than that of the outlet 36. Disposed at the inlet end 31 is an outwardly-extending bristle tube flange 35. The bristle tube flange 35 extends outwardly from the outer surface of the bristle 30 and helps maintain the bristle 30 within the brush portion aperture 26, keeping the bristle 30 from being forced through the aperture 26.

It is to be appreciated that the bristle 30 could be pressure-fit into the aperture 26 or could be attached with an adhesive or other securement means, such as by sonically welding the brush 10 after the bristles 30 are inserted within the brush portion 22 of the brush 10 where the component parts of the brush 10 are fabricated of plastic material. Alternatively, a secondary flange 37 could also be formed within the outer surface of the bristle 30 and at a distance from the flange 35 that is approximately equal to the thickness of the brush portion 22, which would also be equal to the distance from the back surface 21 of the brush portion 24 to the front surface 23 of the brush portion 22. See FIG. 2A. Such a flange 37 would prevent the bristles 30 from being displaced from, or rearwardly pushed out of, the apertures 26 when axial force is exerted on the second ends 33 of the bristles 30 during use of the brush 10.

It should also be noted, by specific reference to FIGS. 1, 2 and 3, that the plurality of bristles 30 is preferably disposed in a particular pattern. That is, the bristles 30 are disposed in alternating transverse rows of apertures 26 that are defined within the brush portion 22 of the brush 10. In this fashion, one transverse row of apertures 26 has bristles 30 disposed within each aperture 26 of that row of apertures 26, while the next adjacent row of apertures 26 does not. This pattern is repeated across the complete brush portion 22 of the brush 20. This is done for a reason, which is a primary purpose in the device of the present invention. Alternate configurations could be used as long as an adequate number of apertures 26 contain bristles 30 within them. An arrangement whereby equal numbers of apertures 26 with bristles 30 is used in conjunction with the same number of apertures 26 without bristles 30 is optimal.

With alternating rows of apertures 26 comprised of those having bristles 30 and other apertures 26 that do not, water 100 coming from the water supply source strikes the back surface 21 of the brush portion 22. As it does, the water 102, 104 passes through the brush portion 22 and exits from the front surface 23 of the brush portion 22 in a specific desired pattern. Again, see FIG. 2. That is, water 100 entering an aperture 26 that does not have a bristle 30 disposed within it, passes through the aperture 26 and is dispersed at the front surface 23 of the brush portion 22. On the other hand, water 100 entering an aperture 26 that has a bristle 30 disposed within it passes into the bristle tube inlet 32, through the tapered bristle tube 34 and out of the bristle tube outlet 36, the water 104 being dispersed at a distance from the front surface 23 of the brush portion 22. In this fashion, water 102, 104 is dispersed onto the object being washed at two specific points. When used as intended, the brush 10 disperses water on top of the hair of a person or pet by means of the water 102 passing through the apertures 26 and well below the hair and directly onto the scalp of the person or pet by means of the water 104 passing through the bristles 30. This "dual rinsing action" allows the rinsing process to be more complete with less water needing to be used to rinse the hair of the user or of the user's pet. Additionally, and because the bristle tubes 34 are tapered, the water 104 leaves the bristle tube outlets 36 at a slightly lower pressure and slightly higher velocity, thus enhancing the spray and rinse action of the device 10.

Figure 4:
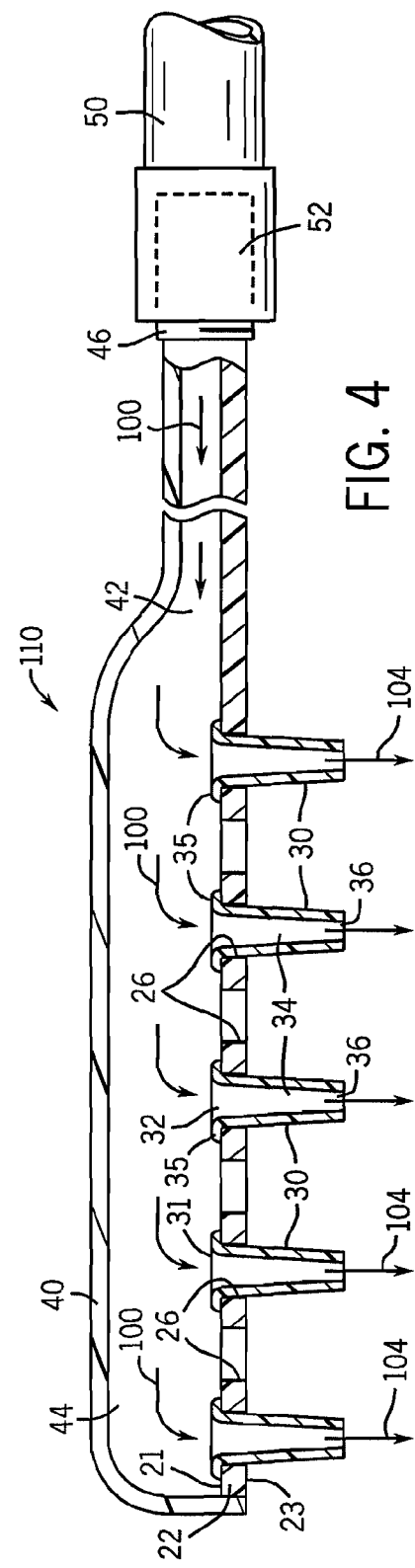
FIG. 4 is an enlarged right side elevational and cross-sectioned view of a second preferred embodiment of a hair wash and rinse brush that is constructed in accordance with the present invention.

Referring now to FIG. 4, it illustrates an alternative embodiment of the brush 110 of the present invention. In this alternative embodiment, the brush 110 is fabricated with the same elements as the brush 10 described above, but with a further enhancement. Specifically, the enhancement is an enclosure 40 that is attached to the brush 10 so as to create a water cavity 44 above the brush portion 22. The cavity 44 has an inlet 42 that is disposed above the handle portion 24. A male-threaded attachment means 46 is provided such that the brush 110 can be attached to a hose or other water supply line 50 of conventional manufacture, the hose 50 having a female threaded hose attachment means 52. In this fashion, no separate water supply would be required for use of the brush 110, where, for example, the object to be washed is a pet and the washing takes place outdoors, or where the washing takes place in a laundry tub where no shower head is present. It would also be possible to modify the brush 10 of the first embodiment to include means for removably attaching the brush enclosure 40, the cavity inlet 42 and the male-threaded brush attachment means 46 to the brush 10. The attachment would create a water seal at the outer perimeter 29 of the brush 10.

In view of the foregoing, it will be seen that there have been provided in this disclosure several embodiments of a new, useful, non-obvious and uncomplicated hair wash and rinse brush that utilizes a modified hair brush concept; that provides a brush with water-rinsing capabilities and also provides multiple areas for hair and skin rinsing; that creates a water rinsing layer that would be on top of the hair to be rinsed and would also create a water rinsing region at or near the skin; that would allow the user to more quickly and more thoroughly rinse soap or shampoo from the hair and skin of the user or the user's pet as may be desired or required; and that would allow the rinse process to be more efficient and take less time to complete, thereby also reducing the amount of water needed to complete the rinsing process.

The details of the invention having been disclosed in accordance with the foregoing, I claim:

1. A hair wash and rinse brush for use with a water supply source, the water supply source providing a substantially downward water flow or spray, the brush consisting of:
   a handle portion;
   a brush portion, the brush portion having a back surface;
   a plurality of apertures defined in transverse rows within the brush portion; and
   a plurality of hollow bristles disposed within some but not all of the plurality of brush portion apertures, the plurality of hollow bristles disposed in alternating transverse rows of apertures, the number of apertures having bristles being substantially equal to the number of apertures without bristles, each hollow bristle comprising a tapered structure and each hollow bristle further comprising a bristle tube defined within the bristle, each bristle tube comprising a first end that is proximal to the brush portion and an inlet at such first end and each bristle tube further comprising a second end that is distal to the brush portion and an outlet at such second end, each bristle tube further comprising a tapered structure where the bristle tube inlet and the bristle tube outlet each comprises a diameter where the diameter of the bristle inlet is greater than the diameter of the bristle tube outlet;

wherein water flowed or sprayed onto the back surface of the brush portion flows through the plurality of brush portion apertures and through the tapered tubes of the bristles wherein each bristle tube further comprising an outwardly-extending bristle flange disposed at an outer surface of the inlet end.

* * * * *